United States Patent
Shin et al.

(10) Patent No.: US 10,191,075 B2
(45) Date of Patent: Jan. 29, 2019

(54) METHOD AND APPARATUS TO DETECT DIRECTION AND VELOCITY OF MOVEMENT OF EQUIPMENT BY USING SINGLE SENSOR

(71) Applicant: Samsung Electronics Co., Ltd, Suwon-si, Gyeonggi-do (KR)

(72) Inventors: Dong-eui Shin, Anyang-si (KR); Myung-won Park, Hwaseong-si (KR); Jae-heung Park, Suwon-si (KR); Ki-oh Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1154 days.

(21) Appl. No.: 13/967,511

(22) Filed: Aug. 15, 2013

(65) Prior Publication Data

US 2014/0288879 A1  Sep. 25, 2014

(30) Foreign Application Priority Data

Mar. 25, 2013  (KR) .................. 10-2013-0031705

(51) Int. Cl.
  *G01P 5/00*   (2006.01)
  *G01P 3/481*  (2006.01)
  *G01P 13/04*  (2006.01)

(52) U.S. Cl.
  CPC .............. *G01P 3/481* (2013.01); *G01P 13/04* (2013.01); *G01P 13/045* (2013.01)

(58) Field of Classification Search
  CPC ....................................... G01P 3/481
  USPC ....................................... 702/142
  See application file for complete search history.

(56) References Cited

U.S. PATENT DOCUMENTS

| 4,723,056 A | * | 2/1988 | Tamaru | G06F 3/045 |
| | | | | 178/18.02 |
| 4,931,727 A | * | 6/1990 | Yamanoue | G01P 3/487 |
| | | | | 188/181 R |
| 5,739,746 A | * | 4/1998 | Shaffer | B60N 2/002 |
| | | | | 340/425.5 |
| 5,998,780 A | * | 12/1999 | Kramer | G01S 11/12 |
| | | | | 250/221 |
| 8,260,568 B2 | | 9/2012 | Tatenuma et al. | |

(Continued)

FOREIGN PATENT DOCUMENTS

JP  2012-088257  5/2012

*Primary Examiner* — Toan Le
*Assistant Examiner* — Xiuquin Sun
(74) *Attorney, Agent, or Firm* — Staas & Halsey LLP

(57) ABSTRACT

An apparatus to detect a direction or velocity of a movement of equipment by using a single sensor. The apparatus includes a conversion unit that converts sensed information obtained from the single sensor into a voltage value corresponding to the movement of the equipment, a determination unit that determines whether one of a first interrupt and a second interrupt occurs, the first interrupt occurring when the converted voltage value reaches a threshold value and the second interrupt occurring when a preset amount of time passes from a time when the single sensor starts operating, and a calculation unit that calculates one of the direction and the velocity of the movement of the equipment by using voltage information at time s when the first interrupt or the second interrupt occurs and voltage information at a predetermined time before the times when the first interrupt or the second interrupt occurs.

12 Claims, 6 Drawing Sheets

(56) References Cited

U.S. PATENT DOCUMENTS

| | | | | |
|---|---|---|---|---|
| 2002/0030487 A1* | 3/2002 | Shinjo | ................... | G01D 5/147 324/207.21 |
| 2006/0132084 A1* | 6/2006 | DeLange | ................ | H02P 21/34 318/802 |
| 2009/0040504 A1* | 2/2009 | Muneishi | ........... | G01D 5/34792 356/28 |

* cited by examiner

METHOD AND APPARATUS TO DETECT DIRECTION AND VELOCITY OF MOVEMENT OF EQUIPMENT BY USING SINGLE SENSOR

CROSS-REFERENCE TO RELATED APPLICATIONS

This application claims the benefit of Korean Patent Application No. 10-2013-0031705, filed on Mar. 25, 2013, in the Korean Intellectual Property Office, the disclosure of which is incorporated herein in its entirety by reference.

BACKGROUND OF THE INVENTION

1. Field of the Invention

The present inventive concept relates to a method and an apparatus to detect the direction and velocity of movement of equipment by using a single sensor.

2. Description of the Related Art

Recently, a technology to detect movement information of equipment by using sensors has been developed. For example, two sensors are arranged with a phase difference of 90 degrees therebetween in a certain area and sense information as equipment moves, and a movement direction of the equipment is detected by using the information sensed by the sensors. In another example, the direction of movement of equipment is detected by delaying information sensed by a sensor, for example, a signal obtained by the sensor, and analyzing the delayed signal.

However, when movement information of equipment is detected by using a plurality of sensors, the size of a system including the plurality of sensors becomes very large and often impractical. Also, if it is necessary to delay a signal obtained by a sensor in order to obtain movement information, a delay device needs to be further included in a system for detection movement information, and thus, the configuration of the system becomes complicated.

SUMMARY OF THE INVENTION

The present inventive concept provides a method and an apparatus to detect a direction and velocity of movement of equipment by using a single sensor.

The present inventive concept also provides a non-transitory computer-readable recording medium storing a program to execute the method in a computer.

Additional features and utilities of the present general inventive concept will be set forth in part in the description which follows and, in part, will be obvious from the description, or may be learned by practice of the general inventive concept.

According to exemplary embodiments of the present inventive concept, there is provided an apparatus to detect a direction or velocity of movement of equipment by using a single sensor. The apparatus includes a conversion unit to convert sensed information obtained from the single sensor into a voltage value corresponding to the movement of the equipment, a determination unit to determine whether one of a first interrupt and a second interrupt occurs, the first interrupt occurring when the converted voltage value reaches a threshold value and the second interrupt occurring when a preset amount of time passes from a time when the single sensor starts operating, and a calculation unit to calculate the direction or the velocity of the movement of the equipment by using voltage information at times when the first interrupt or the second interrupt occurs and voltage information at a predetermined time before the time when the first interrupt or the second interrupt occurs.

According to exemplary embodiments of the present inventive concept, there is also provided a method of detecting a direction or velocity of movement of equipment by using a single sensor. The method includes converting sensed information from the single sensor into a voltage value corresponding to the movement of the equipment, determining whether one of a first interrupt and a second interrupt occurs or not, the first interrupt occurring when the converted voltage value reaches a threshold value and the second interrupt occurring when a preset amount of time passes from a time when the single sensor starts operating, and determining the direction or the velocity of the movement of the equipment by using voltage information at times where the first interrupt or the second interrupt occurs and voltage information at a predetermined time before the time when the first interrupt and the second interrupt occur.

According to exemplary embodiments of the present inventive concept, there is also provided a non-transitory computer-readable recording medium to execute a method of detecting a direction or velocity of movement of equipment by using a single sensor in a computer. The method includes converting sensed information from the single sensor into a voltage value corresponding to the movement of the equipment, determining whether one of a first interrupt and a second interrupt occurs or not, the first interrupt occurring when the converted voltage value reaches a threshold value and the second interrupt occurring when a preset amount of time passes from a time when the single sensor starts operating, and calculating the direction or the velocity of the movement of the equipment by using voltage information at times when the first interrupt or the second interrupt occurs and voltage information at a predetermined time before the times when the first interrupt or the second interrupt occurs.

According to exemplary embodiments of the present inventive concept, there is also provided a system to detect a direction or velocity of movement of equipment by using a single sensor. The system includes the equipment moving while being adjacent to the sensor, the sensor sensing the movement of the equipment, and a detection apparatus converting sensed information from the single sensor into a voltage value corresponding to the movement of the equipment, determining whether one of a first interrupt and a second interrupt occurs or not, the first interrupt occurring when the converted voltage value reaches a threshold value and the second interrupt occurring when a preset amount of time passes from a time when the single sensor starts operating, and calculating the direction or the velocity of the movement of the equipment by using voltage information at times when the first interrupt or the second interrupt occurs and voltage information at a predetermined time before the time when the first interrupt or the second interrupt occurs.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
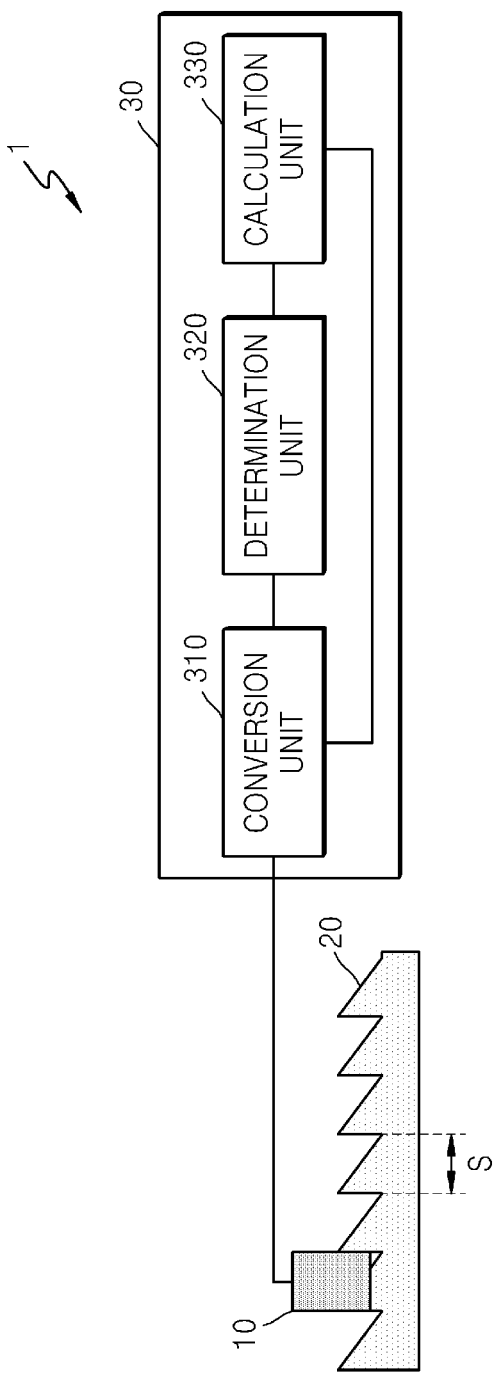
FIG. 1 is a configuration view illustrating a detection system to detect a direction and velocity of movement of equipment according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a configuration view illustrating a detection system 1 to detect a direction and velocity of movement of equipment according to an exemplary embodiment of the present inventive concept.

Referring to FIG. 1, the detection system 1 may include a sensor 10, equipment 20, and a detection apparatus 30. Also, the detection apparatus 30 may include a conversion unit 310, a determination unit 320, and a calculation unit 330.

Regarding the detection apparatus 30 shown in FIG. 1, only elements related to the present embodiment are shown. Accordingly, one of ordinary skill in the art may understand that the detection apparatus 30 may further include other general elements in addition to the elements shown in FIG. 1.

The conversion unit 310, the determination unit 320, and the calculation unit 330 of the detection apparatus 30 may correspond to one or a plurality of processors. The processors may be formed by a plurality of logic gate arrays or as a combination of a general micro processor and a memory in which a program executable in the micro processor is stored. Also, one of ordinary skill in the art can understand that the processors may be provided in other hardware forms.

The sensor 10 senses a movement of the equipment 20. For example, the sensor 10 may sense the movement of the equipment 20 by measuring an area of the equipment 20 exposed to an effective area of the sensor 10. Also, the sensor 10 may sense the movement of the equipment 20 by recognizing a certain sign (not shown) marked on the equipment 20.

According to the present embodiment, as only one sensor 10 is used, the size and configuration of the sensing device can be simplified and condensed, and also the configuration of the detection system 1 overall can be simplified.

The equipment 20 moves while the sensor 10 is adjacent thereto. For example, the equipment 20 may move while the effective area of the sensor 10 is adjacent to the equipment 20.

According to the present embodiment, the equipment 20 includes one or more repetitive saw-toothed elements. Slopes of teeth of the one or more saw-toothed elements are different from each other. The one or more saw-toothed elements may include triangular teeth, but the present inventive concept is not limited thereto.

Since the slopes of teeth are different from each other, the area of the equipment 20 exposed to the sensor 10 may change at a uniform rate according to the movement of the equipment 20.

The detection apparatus 30 converts sensed information obtained from the single sensor 10 into a voltage value corresponding to the movement of the equipment 20. Also, the detection apparatus 30 determines whether a first interrupt or a second interrupt occurs or not. In this case, the first interrupt indicates an interrupt occurring when the converted voltage value reaches a threshold value. Also, the second interrupt indicates an interrupt occurring when a preset amount of time elapses from a time when the single sensor 10 starts operating. Also, the detection apparatus 30 calculates the direction and velocity of the movement of the equipment 20 by using voltage information at times where the first interrupt or the second interrupt occurs and voltage information at a predetermined time before the first interrupt or the second interrupt occurs.

Hereinafter, detailed operations of the conversion unit 310, the determination unit 320, and the calculation unit 330 in the detection apparatus 30 will be described.

The conversion unit 310 converts sensed information obtained from the single sensor 10 into a voltage value corresponding to the movement of the equipment 20. In detail, the conversion unit 310 may convert sensed information into a voltage value based on an area of the equipment 20 sensed by the sensor 10 as the equipment 20 moves while the sensor 10 is adjacent thereto.

The sensor 10 senses the area of the equipment 20 moving while the sensor 10 is adjacent thereto. In detail, the sensor 10 senses the area of the equipment 20 overlapping an effective area of the sensor 10. After this sensing, the sensor 10 transmits a result of the sensing, that is, the sensed information, to the conversion unit 310.

The conversion unit 310 converts the area of the equipment 20 overlapping the effective area of the sensor 10 by using the sensed information transmitted from the sensor 10. For example, the conversion unit 310 may perform conversion by using a mapping table between sensed areas and voltages, which is previously stored in a storage unit (not shown) in the detection apparatus 30.

In this case, the storage unit is a general storage medium, which may be a hard disk drive HDD, a read only memory (ROM), a random access memory (RAM), a flash memory, and a memory card.

Figure 2A:
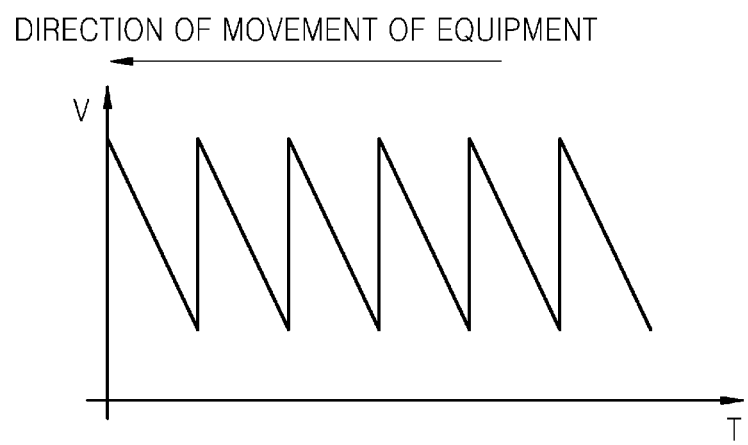
FIGS. 2A and 2B are graphs illustrating examples of operation of a conversion unit according to an embodiment of the present inventive concept.
Figure 2B:
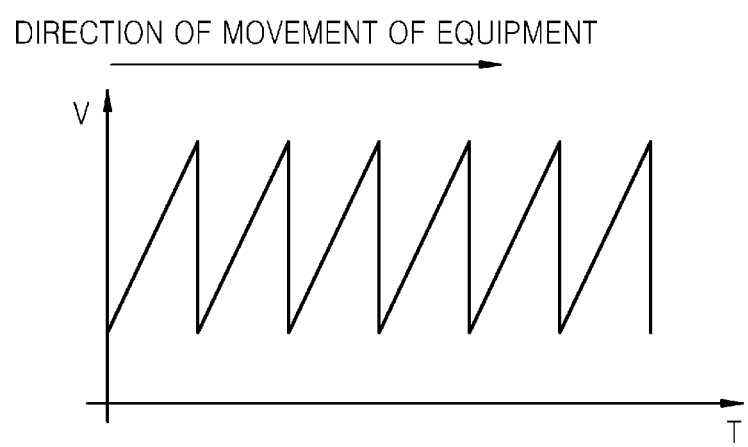

FIGS. 2A and 2B are time-voltage (T-V) graphs illustrating examples of operation of conversion unit 310 according to an embodiment of the present inventive concept.

FIG. 2A is a graph illustrating a variance of the voltage V according to time T as converted by the conversion unit 310 when the equipment 20 moves from right to left with respect to the sensor 10. Also, FIG. 2B is a graph illustrating a variance of the voltage V according to time T as converted by the conversion unit 310 when the equipment 20 moves from left to right with respect to the sensor 10.

With regard to FIGS. 2A and 2B, based on the shape of the element of the equipment 20 shown in FIG. 1, the conversion unit 310 operates in such a way that the size of an area of the equipment 20 overlapping the sensor 10 is proportional to the size of a voltage. When the conversion unit 310 operates in such a way that the size of the area of the equipment 20 is inversely proportional to the voltage, graphs having an opposite form to the graphs shown in FIGS. 2A and 2B may be formed, which can be easily understood by one of ordinary skill in the art. Also, the shape of the element of the equipment 20 is not limited to that shown in FIG. 1.

Also, conversion results of the conversion unit 310 are shown as graphs in FIGS. 2A and 2B, but the present inventive concept is not limited thereto, and the conversion results may be provided in various forms such as time-voltage tables.

Referring to FIG. 2A, it is assumed that a starting point of the time-voltage graph is a time when the equipment 210 starts overlapping the sensor 10. Referring to FIG. 1, the slope of the left slope of the equipment 20 is greater than the slope of the right slope. Also, a part of the equipment 20 initially overlapping the sensor 10 is the left slope. Accordingly, the time-voltage T-G graph converted by the conversion unit 310 has a form in which a voltage is high at the starting point and the voltage gradually decreases. Also, since the equipment 20 includes the elements with the same repetitive shape, the time-voltage T-V graph converted by the conversion unit 310 also has a repetitive shape.

The graph shown in FIG. 2B illustrates a result obtained by the conversion unit 310 when the direction of the movement of the equipment 20 is opposite to that in FIG. 2A. Since the shape of the element of the equipment 20 is the same, the graph shown in FIG. 2B has an opposite shape to that shown in FIG. 2A, which is obvious to one of ordinary skill in the art.

Referring again to FIG. 1, the conversion unit 310 transmits information of converted voltages to the determination unit 320 and the calculation unit 330.

The determination unit 320 determines whether a first interrupt or a second interrupt occurs or not while the sensor 10 is operating. In this case, the first interrupt indicates an interrupt occurring when a converted voltage value reaches a threshold value and the second interrupt indicates an interrupt occurring when a preset amount of time elapses from a time when the sensor 10 starts operating. For example, the threshold value when the first interrupt occurs may be a random voltage value between the maximum voltage value and the minimum voltage value among the voltage values transmitted from the conversion unit 310.

In this case, the threshold value may be automatically set with no intervention of a user by a setting unit 340 (refer to FIG. 6) that will be described below or may be set by the user through an interface unit (not shown) included in the detection apparatus 30. Also, a time interval ti may be automatically set with no intervention of the user by the setting unit 340 or may be set by the user through the interface unit included in the detection apparatus 30.

In this case, the interface unit may include all input/output devices such as a display panel, a mouse, a keyboard, a touch screen, a monitor, etc. and software modules to execute the same.

When the first interrupt or the second interrupt occurs, the determination unit 320 transmits interrupt occurrence information to the calculation unit 330. In detail, when the first interrupt occurs, the determination unit 320 may transmit occurrence information to a first calculator 331 (refer to FIG. 3) that will be described below. When the second interrupt occurs, the determination unit 320 may transmit occurrence information to a second calculator 332 (refer to FIG. 3). As pointed out above, the calculation unit 330 may alternatively be provided in the form of one or a plurality of processors.

The calculation unit 330 calculates the direction and velocity of the movement of the equipment 20 by using voltage information at times when the first interrupt or the second interrupt occurs and voltage information at a predetermined time before the times when the first interrupt or the second interrupt occurs. In this case, the voltage information indicates information transmitted from the conversion unit 310.

Figure 3:
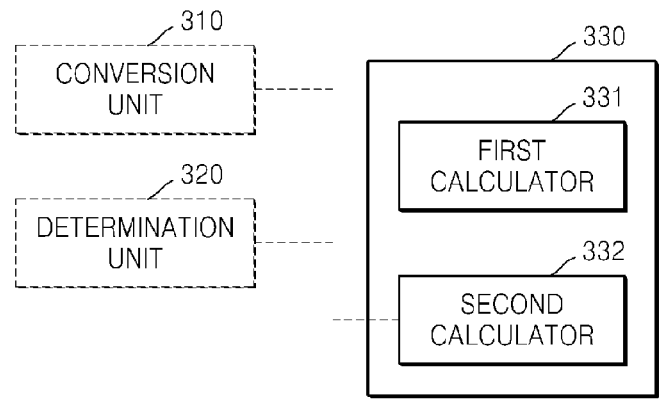
FIG. 3 is a view illustrating a calculation unit according to an embodiment of the present inventive concept.

FIG. 3 is a view illustrating the calculation unit 330 according to an embodiment of the present inventive concept.

Referring to FIG. 3, the calculation unit 330 may include the first calculator 331 to calculate the direction and velocity of the movement of the equipment 20 when the first interrupt occurs and the second calculator 332 to calculate the direction and velocity of the movement of the equipment 20 when the second interrupt occurs.

As described supra, the first calculator 331 and the second calculator 332 of the calculation unit 330 shown in FIG. 3 may correspond to one or a plurality of processors. The processors may be provided as a plurality of logic gate arrays or may be provided as a combination of a general micro processor and a memory in which a program executable in the micro processor is stored. Also, the processors may be provided in other hardware forms, which may be understood by one of ordinary skill in the art.

The first calculator 331 may not calculate the direction and velocity of the movement of the equipment 20 although it receives the information that the first interrupt occurs from the determination unit 320. In detail, when a preset voltage period does not occur, although the first interrupt occurs, the first calculator 331 may not calculate the direction and velocity of the movement of the equipment 20. That is, when it is assumed that a period when a maximum value and a minimum value of a voltage each appear once is one period, the first calculator 331 may calculate the direction and velocity of the movement of the equipment 20 only when the first interrupt occurs after n time periods occur, wherein n is a preset number.

In this case, n may be automatically set with no intervention of the user by the setting unit 340, or may be set by the user through the interface unit included in the detection apparatus 30. For example, n may be 6, that is, the maximum value and the minimum value may each appear 6 times, but the present inventive concept is not limited thereto.

The first calculator 331 calculates a peak to peak voltage (Vpp) by using the maximum values and minimum values for the n time periods. For example, the first calculator 331 may calculate the Vpp by using a method of obtaining an average of the n maximum values and minimum values obtained during the n time periods. The first calculator 331 may transmit the calculated Vpp to the second calculator 332 and to the storage unit included in the detection apparatus 30 to store therein.

After that, the first calculator 331 calculates the velocity of the equipment 20 by using the threshold value and a voltage value at a predetermined time when the first interrupt occurs. Also, the first calculator 331 calculates the direction of the movement of the equipment 20 by using a rate of change of a voltage according to the time when the first interrupt occurs and a rate of change of a voltage according to the time when the first interrupt previously occurred.

Figure 4:
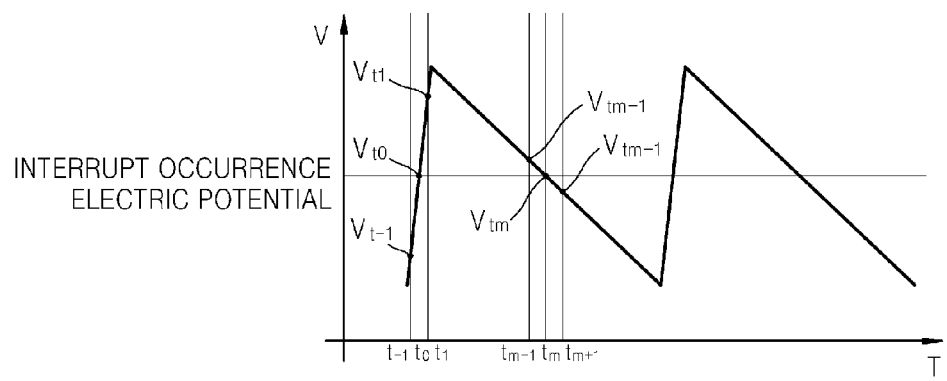
FIG. 4 is a view illustrating an example where a first calculator calculates the direction and velocity of the movement of the equipment according to an embodiment of the present inventive concept.

FIG. 4 is a view illustrating an example that the first calculator 331 calculates the direction and velocity of the movement of the equipment 20. In detail, the graph shown in FIG. 4 shows a variance in voltages in a section where n time periods pass among variances in voltages according to time obtained by the conversion unit 310.

Referring to FIG. 4, in a section including t0, the level of a voltage V gradually increases with time T. In a section including tm, the level of the voltage gradually decreases with time T. Hereinafter, for convenience of description, a section in which the level of the voltage V gradually increases is an ascending section and a section in which the level of the voltage V gradually decreases is a descending section. Also, an electric potential where the first interrupt occurs is Vt0 and a time where the first interrupt occurs is t0 and tm. Also, it is assumed that the conversion unit 310 converts an area of the equipment 20 overlapping an effective area of the sensor 10 for each time interval $\Delta t$, for example, $\Delta t$=t0−t−1 into a corresponding voltage value.

When the first calculator 331 receives information that the first interrupt occurs from the determination unit 320, the first calculator 331 determines whether the time where the first interrupt occurs is in the ascending section or the descending section. The first calculator 331 compares a voltage value prior to occurrence of the first interrupt with an electric potential of the occurrence of the first interrupt, that is, the threshold value among the voltage information received from the conversion unit 310, thereby determining whether the time where the first interrupt occurs is in the ascending section or the descending section.

For example, when it is assumed that the first interrupt occurs at time t0, the first calculator 331 compares an electric potential Vt−1 at $\Delta t$ prior to t0, that is, t−1, with Vt0. In FIG. 4, since Vt0>Vt−1, the first calculator 331 determines that the section of the time t0 is the ascending section. Also, when it is assumed that the first interrupt occurs at time tm, the first calculator 331 compares an electric potential Vtm−1 at $\Delta t$ prior to tm, that is, tm−1, with Vtm. In FIG. 4, since Vtm−1>Vtm, the first calculator 331 determines that the section of the time tm is the descending section.

When it is determined that the section of the time tm is the ascending section, the first calculator 331 calculates a slope of a voltage graph and velocity. In detail, the first calculator 331 may calculate the slope of the voltage graph by using Equation 1 as follows.

$$V_{slope2} = \frac{\Delta V}{\Delta t} \quad \text{Equation (1)}$$

In Equation 1, $\Delta V = V_{t0} - V_{t-1}$ and $\Delta t = t_0 - t_{-1}$.

Also, the first calculator 331 may calculate the velocity by using Equation 1 as follows. In this case, the velocity is the velocity of the equipment 20.

$$v = \frac{s}{t} \quad \text{Equation (2)}$$

In Equation 2, s designates a length of one of repeated teeth of the element of the equipment 20 as shown in FIG. 1. Also, t designates an amount of time for moving by s in the ascending section.

On the other hand, when it is determined that the section of the time tm is the descending section, the first calculator 331 calculates the slope of the voltage graph. In detail, the first calculator 331 may calculate the slope of the voltage graph by using Equation 3 as follows.

$$V_{slope1} = \frac{\Delta V}{\Delta t} \quad \text{Equation (3)}$$

In Equation 3, $\Delta V = V_{tm} - V_{tm-1}$ and $\Delta t = t_m - t_{m-1}$.

The first calculator 331 detects the direction of the movement of the equipment 20 by comparing values of the calculated Vslope2 and Vslope1 with each other. In detail, when $|V_{slope2}| > |V_{slope1}|$, the first calculator 331 determines that the equipment 20 moves from right to left with respect to the sensor 10. In contrast, when $|V_{slope1}| > |V_{slope2}|$, the first calculator 331 determines that the equipment 20 moves from left to right with respect to the sensor 10.

Referring to FIG. 3, the second calculator 332 may not calculate the velocity of the movement of the equipment 20 although it receives the information that the second interrupt occurs from the determination unit 320. As described above, when n time periods do not pass, the second calculator 332 may not calculate the velocity of the movement of the equipment 20 although the second interrupt occurs.

When n time periods pass, the second calculator 332 may calculate the Vpp by using the same method of calculating the Vpp performed by the first calculator 331 or may calculate the velocity of the equipment 20, which will be described below, by using the Vpp received from the first calculator 331.

After that, the second calculator 332 calculates the velocity of the movement of the equipment 20 by using a combination of a voltage value at a predetermined time before the time when the second interrupt occurs, a voltage value at the time that the second interrupt occurs, the predetermined time, a difference between a maximum value and a minimum value of a converted voltage value, and the length of the equipment 20. In this case, the predetermined time is $\Delta t$ and the difference between the maximum value and the minimum value of the converted voltage value is Vpp.

Figure 5:
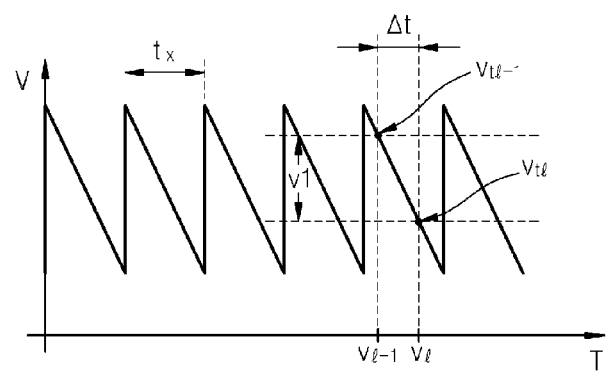
FIG. 5 is a configuration view illustrating an example where a second calculator calculates the direction and velocity of the movement of the equipment according to an embodiment of the present inventive concept.

FIG. 5 is a view illustrating an example where the second calculator 332 calculates the velocity of movement of the equipment 20. In detail, the graph shown in FIG. 5 shows a variance in voltages in a section where n time periods pass among variances in voltages V according to time T obtained by the conversion unit 310.

When it is assumed that the time where the second interrupt occurs is t1 and a voltage at t1 is Vt1, the second calculator 332 determines whether voltages Vt1−1 and Vt1 at a time of t1−1 are the same. In this case, t1−t1−1=$\Delta t$.

When Vt1−1 and Vt1 are the same, the second calculator 332 may not calculate the velocity of the movement of the equipment 20 and may request an adjustment unit 350 (refer to FIG. 6) to adjust the occurrence interval ti of the second interrupt.

When Vt1−1 and Vt1 are not the same, the second calculator 332 calculates the velocity of the movement of the equipment 20. In detail, the second calculator 332 may calculate the velocity v of the movement of the equipment by using Equation 4 as follows.

$$v = s * \frac{Vpp/V1}{\Delta t} \quad \text{Equation (4)}$$

In Equation 4, s is the length of one of the repeated teeth of the element of the equipment 20 as shown in FIG. 1, Vpp is a peak to peak voltage. Also, $V1=|V_{tl-1}-V_{tl}|$ and $\Delta t = t_l - t_{l-1}$.

As described above, the direction or the velocity of the movement of the equipment 20 is calculated by using only sensed information obtained from the single sensor by the calculation unit 330, in detail, the first calculator 331 and the second calculator 332, thereby being able to reduce the size of a sensor portion. Also, since the detection apparatus 30 does not need to include an additional signal delay module, the configuration of the detection system 1 may be simplified.

Figure 6:
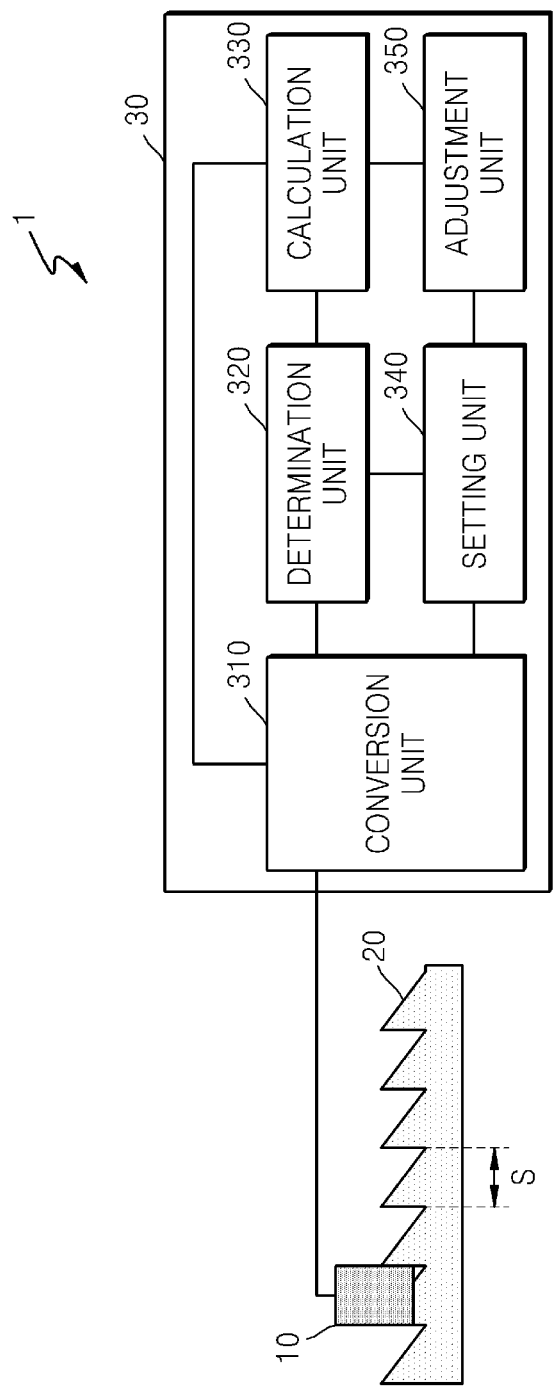
FIG. 6 is a configuration view illustrating another detection system to detect a direction and velocity of movement of equipment according to another exemplary embodiment.

FIG. 6 is a configuration view illustrating another example of the detection system 1 to detect the direction and velocity of the movement of the equipment 20.

Referring to FIG. 6, the detection apparatus 30 may further include the setting unit 340 and the adjustment unit 350 in addition to the conversion unit 310, the determination unit 320, and the calculation unit 330.

In the detection apparatus 30 shown in FIG. 6, there are shown only the elements related to the present embodiment. Accordingly, a person skilled in the art would understand that the detection apparatus 30 may further include other general elements in addition to the elements shown in FIG. 6.

Also, the conversion unit 310, the determination unit 320, the calculation unit 330, the setting unit 340, and the adjustment unit 350 of the detection apparatus 30 may correspond to one or a plurality of processors. The processors may be provided as a plurality of logic gate arrays or may be provided as a combination of a general micro processor and a memory in which a program executable in the micro processor is stored. Also, the processors may be provided as other forms of hardware, which would be understood by a person skilled in the art.

Hereinafter, detailed operations of the conversion unit 310, the determination unit 320, and the calculation unit 330 are the same as described above. Accordingly, detailed descriptions thereof will be omitted.

The setting unit 340 determines a threshold, that is, an electric potential, where the first interrupt occurs, an amount of time where the second interrupt occurs from a time when the single sensor 10 stars operating, that is, an occurrence interval ti of the second interrupt, and a predetermined time Δt from a time when the first interrupt or the second interrupt occurs.

The setting unit 340 may transmit the predetermined time Δt to the conversion unit 310, and the conversion unit 310 may convert an area where the equipment 20 overlaps the sensor 10 into a voltage for each predetermined amount time Δt. Also, the setting unit 340 may transmit information related to the threshold value and the time ti from the time when the single sensor 10 starts operating to the time when the second interrupt occurs to the determination unit 320, and the determination unit 320 may determine whether an interrupt occurs by using the transmitted information.

The adjustment unit 350 adjusts a preset time when the voltage value prior to the predetermined time from the time when the second interrupt occurs and the voltage value at the time when the second interrupt occurs are the same. In this case, the preset time indicates the occurrence interval ti of the second interrupts. A detailed condition that the adjustment unit 350 adjusts the occurrence interval ti of the second interrupts is the same as described above with reference to FIG. 5.

Figure 7:
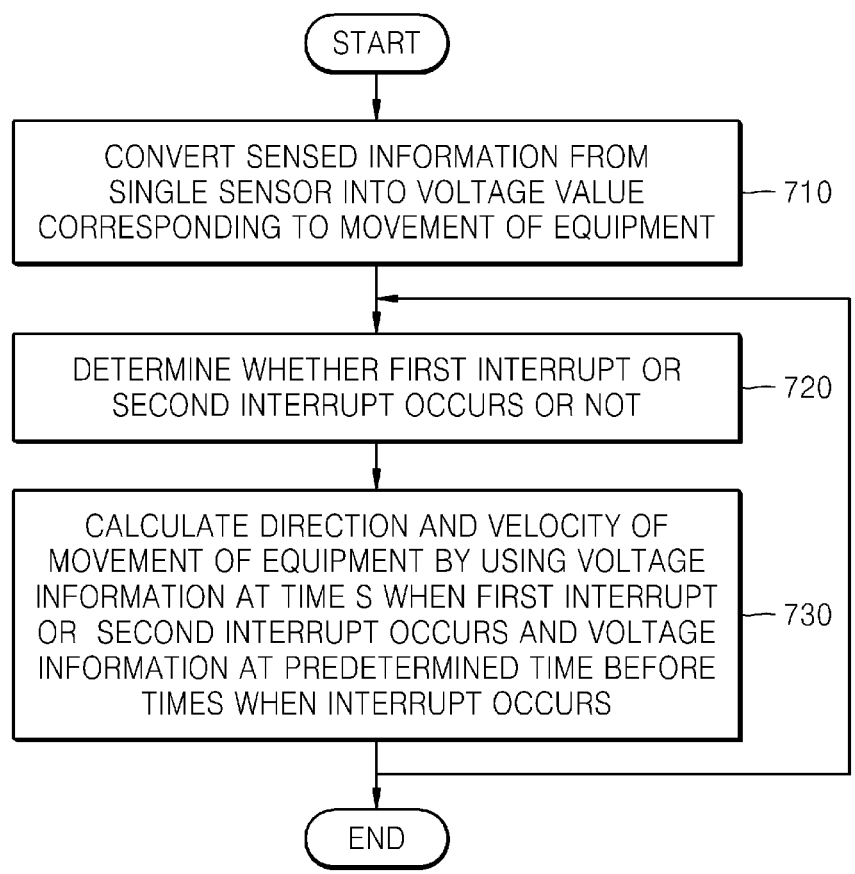
FIG. 7 is a flowchart illustrating a method of detecting a direction and velocity of movement of equipment according to an exemplary embodiment of the present inventive concept.

FIG. 7 is a flowchart illustrating a method of detecting the direction and velocity of the movement of the equipment 20 according to an embodiment of the present inventive concept.

Referring to FIG. 7, the method of detecting the direction and velocity of the movement of the equipment 20 includes operations time-sequentially processed by one of the detection system 1 and the detection apparatus 30 shown in FIGS. 1, 3, and 6. Accordingly, the contents with respect to the detection system 1 or the detection apparatus 30 described with reference to FIGS. 1, 3, and 6, which will be omitted hereafter, may also apply to the method shown in FIG. 7.

In an operation 710, the conversion unit 310 converts sensed information obtained from the single sensor 10 into a voltage value corresponding to the movement of the equipment 20. In detail, the conversion unit 310 may convert sensed information into a voltage value based on an area of the equipment 20 sensed by the sensor 10 as the equipment 20 moves with the sensor 10 adjacent thereto.

In an operation 720, the determination unit 320 determines whether a first interrupt or a second interrupt occurs. In this case, the first interrupt indicates an interrupt occurring when a converted voltage value reaches a threshold value and the second interrupt indicates an interrupt occurring when a preset amount of time elapses from a time when the sensor 10 starts operating.

In an operation 730, the calculation unit 330 calculates the direction and velocity of the movement of the equipment 20 by using voltage information at times when the first interrupt or the second interrupt occurs and voltage information at a predetermined time before the time when the interrupt occurs. In this case, the calculation unit 330 includes the first calculation unit 331 calculating the direction and velocity of the movement of the equipment 20 when the first interrupt occurs and the second calculation unit 332 calculating the direction and velocity of the movement of the equipment 20 when the second interrupt occurs.

Figure 8:
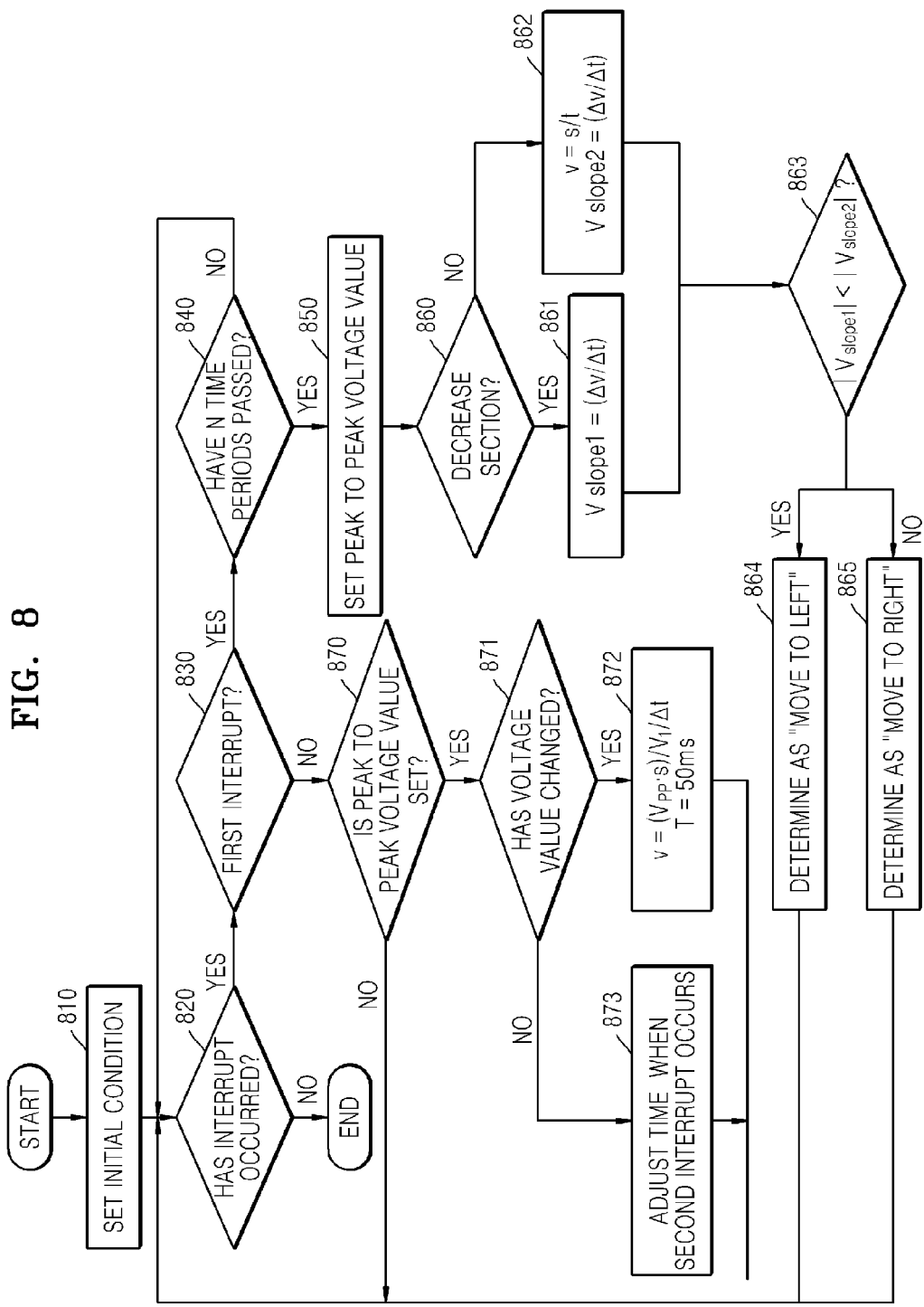
FIG. 8 is a flowchart illustrating a method of detecting a direction and velocity of movement of equipment according to another embodiment of the present inventive concept.

FIG. 8 is a flowchart illustrating a method of detecting the direction and velocity of the movement of the equipment 20 according to another embodiment of the present inventive concept.

Referring to FIG. 8, the method of detecting the direction and velocity of the movement of the equipment 20 includes operations time-sequentially processed by one of the detection system 1 and the detection apparatus 30 shown in FIGS. 1, 3, and 6. Accordingly, the contents with respect to the detection system 1 or the detection apparatus 30 described with reference to FIGS. 1, 3, and 6, which will be omitted hereafter, may also apply to the method shown in FIG. 8. Also, the contents described with respect to the detection method shown in FIG. 7 may also apply to the method shown in FIG. 8.

In an operation 810, the setting unit 340 determines a threshold, that is, an electric potential, when the first interrupt occurs, an amount of time when the second interrupt occurs from a time when the single sensor 10 starts operating, that is, an occurrence interval ti of the second interrupts, and a predetermined time Δt prior to a time when the first interrupt or the second interrupt occurs. In this case, the values set by the setting unit 340 may be automatically set with no intervention by a user by the setting unit 340, or may be set by the user through the interface unit included in the detection apparatus 30.

After that, although not shown in FIG. 8, the conversion unit 310 converts the sensed information obtained from the single sensor 10 into a voltage value corresponding to the movement of the equipment 20.

In an operation 820, the determination unit 320 determines whether the first interrupt or the second interrupt occurs or not. When it is determined that one of the first interrupt and the second interrupt occurs, an operation 830 is performed. If not, the process is finished.

In an operation 830, the determination unit 320 determines whether the interrupt that occurs is the first interrupt. When it is determined that the first interrupt occurs, an operation 840 is performed. If not, an operation 870 is performed.

In the operation 840, the first calculator 331 determines whether the first interrupt occurs after n time periods pass. When it is determined that the first interrupt occurs after the n time periods pass, an operation 850 is performed. If not, the operation 820 is performed again.

In the operation 850, the first calculator 331 sets a Vpp.

In an operation 860, the first calculator 331 determines whether a time when the first interrupt occurs is in a voltage decrease section, that is, a decrease section. When it is determined that the time when the first interrupt occurs in included in the voltage decrease section, that is, the decrease section, a sub-operation 861 is performed to calculate a slope Vslope1 of a voltage graph. If not, a sub-operation 862 is performed to calculate the velocity v of the equipment 20 and a slope Vslope2 of the voltage graph.

In operations 863 to 865, the first calculator 331 detects the direction of the movement of the equipment 20 by comparing values of the calculated Vslope2 and Vslope1 with each other. In detail, when $|V_{slope2}|>|V_{slope1}|$, the first calculator 331 determines that the equipment 20 moves from right to left with respect to the sensor 10 (operation 864). In contrast, when $|V_{slope1}|>|V_{slope2}|$, the first calculator 331 determines that the equipment 20 moves from left to right with respect to the sensor 10 (operation 865).

In the operation 870, the second calculator 332 determines whether the Vpp is set. In this case, the operation of determining whether Vpp is set includes an operation of determining whether the second interrupt occurs after n time periods have passed. When it is determined that the Vpp is set, that is, the second interrupt occurs after the n time periods have passed, an operation 871 is performed. If not, the operation 820 is performed again.

In the operation 871, the second calculator 332 determines whether a voltage value at a time when the second interrupt occurs is the same as a voltage value at Δt prior to the time when the second interrupt occurs. When the voltage values are the same, an operation 873 is performed. If not, an operation 872 is performed.

In the operation 872, the second calculator 332 calculates the velocity of the movement of the equipment 20.

In the operation 873, the adjustment unit 350 adjusts the occurrence interval ti of the second interrupt.

As described above, the detection system 1 may detect the velocity and direction of movement of the equipment by using a single sensor. Also, as only one sensor is used, the configuration of the detection system 1 may be simplified and also the size thereof may be reduced.

On the other hand, the method described above may be made as a program executable in a computer and may be embodied in a general digital computer operating the program by using a non-transitory computer-readable recording medium. Also, a structure of data used in the method may be recorded in a non-transitory computer-readable recording medium through various means. The non-transitory computer-readable recording medium may be, for example, a magnetic storage medium such as a ROM, a RAM, a USB, and a hard disk, optical readable medium such as a CD-ROM and a DVD, and PC interfaces such as PCI, PCI-express, and WiFi.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to detect a direction or a velocity of movement of equipment, the apparatus comprising:
   a sensor; and
   a processor unit configured to:
   measure an area of a region of the equipment overlapping a specific region of the sensor as the equipment moves adjacent to the sensor, using the sensor,
   determine a voltage value corresponding to the measured area of the region of the equipment,
   determine whether one of a first interrupt and a second interrupt occurs, the first interrupt occurring when the determined voltage value reaches a threshold value and the second interrupt occurring when a preset amount of time passes from a time when the sensor starts operating, and
   determine a direction or a velocity of the movement of the equipment by using voltage information at times when the first interrupt or the second interrupt occurs and voltage information at a predetermined time before the times when the first interrupt or the second interrupt occurs,
   wherein the processor comprises a second calculator to calculate the velocity of the movement of the equipment when the second interrupt occurs, and
   wherein the second calculator calculates the velocity of the movement of the equipment by using a combination of a voltage value at a predetermined time before a time when the second interrupt occurs, a voltage value at a time when the second interrupt occurs, the predetermined time, a difference between a maximum value and a minimum value of the converted voltage value, and a length of the equipment.

2. The apparatus of claim 1, wherein the processor further comprises a first calculator to calculate the direction and velocity of the movement of the equipment when the first interrupt occurs, and
   wherein the first calculator calculates the velocity of the movement by using the threshold value and the voltage value at a predetermined time before a time when the first interrupt occurs and calculates the direction of the movement of the equipment by using a rate of change of a voltage according to a time when the first interrupt occurs and a rate of change of a voltage according to a time when the first interrupt previously occurred.

3. The apparatus of claim 1, wherein the processor is further configured to adjust the preset time when a voltage value at a predetermined time before the time when the second interrupt occurs is the same as a voltage value at a time when the second interrupt occurs.

4. The apparatus of claim 1, wherein the equipment comprises one or more repetitive saw-toothed elements, and
   wherein the one or more repetitive saw-toothed elements have teeth having different slopes.

5. The apparatus of claim 1, wherein the processor is further configured to set the threshold value, a time interval from a time when the single sensor starts operating to a time when the second interrupt occurs and the predetermined time before the time when the first interrupt or the second interrupt occurs.

6. A method of detecting a direction or a velocity of movement of equipment by using a sensor, the method comprising:
  measuring an area of a region of the equipment overlapping a specific region of the sensor as the equipment moves adjacent to the sensor, using the sensor;
  determining a voltage value corresponding to the measured area of the region of the equipment;
  determining whether one of a first interrupt and a second interrupt occurs or not, the first interrupt occurring when the determined voltage value reaches a threshold value and the second interrupt occurring when a preset amount of time passes from a time when the sensor starts operating; and
  determining one of a direction and a velocity of the movement of the equipment by using voltage information at times when the first interrupt or the second interrupt occurs and voltage information at a predetermined time before the times when the first interrupt or the second interrupt occurs,
  wherein, in the determining one of the direction and the velocity of the movement of the equipment when the second interrupt occurs, the velocity of the movement of the equipment is calculated by using a combination of a voltage value at a predetermined time before the time when the second interrupt occurs, a voltage value at the time when the second interrupt occurs, the predetermined time, a difference between a maximum value and a minimum value of the converted voltage value, and a length of the equipment.

7. The method of claim 6, wherein the determining one of the direction and the velocity of the movement of the equipment when the first interrupt occurs further comprises:
  calculating one of the direction and velocity of the movement of the equipment;
  wherein the velocity of the movement is calculated by using the threshold value and the voltage value at the predetermined time before the time when the first interrupt occurs and the direction of the movement of the equipment is calculated by using a rate of change in a voltage according to the time when the first interrupt occurs and a rate of change in a voltage according to time when the first interrupt previously occurred.

8. The method of claim 6, further comprising:
  adjusting the preset time when a voltage value at a predetermined time before the time when the second interrupt occurs is the same as a voltage value at time when the second interrupt occurs.

9. The method of claim 6, wherein the equipment comprises one or more repetitive saw-toothed elements, and
  wherein the one or more repetitive saw-toothed elements include teeth having different slopes.

10. The method of claim 6, further comprising:
  setting the threshold value, a time interval from the time when the single sensor starts operating to the time when the second interrupt occurs and the predetermined time before time when the first interrupt or the second interrupt occurs.

11. A non-transitory computer-readable recording medium storing program instructions for causing a computer to execute a method of detecting a direction or velocity of a movement of equipment by using a sensor, the method comprising:
  measuring an area of a region of the equipment overlapping a specific region of the sensor as the equipment moves adjacent to the sensor, using the sensor;
  determining a voltage value corresponding to the measured area of the region of the equipment;
  determining whether one of a first interrupt and a second interrupt occurs or not, the first interrupt occurring when the determined voltage value reaches a threshold value and the second interrupt occurring when a preset amount of time passes from a time when the sensor starts operating; and
  determining one of a direction and a velocity of the movement of the equipment by using voltage information at times when the first interrupt or the second interrupt occurs and voltage information at a predetermined time before the times when the first interrupt or the second interrupt occurs,
  wherein, in the determining one of the direction and the velocity of the movement of the equipment when the second interrupt occurs, the velocity of the movement of the equipment is calculated by using a combination of a voltage value at a predetermined time before the time when the second interrupt occurs, a voltage value at the time when the second interrupt occurs, the predetermined time, a difference between a maximum value and a minimum value of the converted voltage value, and a length of the equipment.

12. A system of detecting a direction and velocity of a movement of equipment by using a sensor, the system comprising:
  the equipment that moves while the sensor is adjacent thereto;
  the sensor to sense the movement of the equipment; and
  a detection apparatus configured to:
    measure an area of a region of the equipment overlapping a specific region of the sensor as the equipment moves adjacent to the sensor, using the sensor,
    determine a voltage value corresponding to the measured area of the region of the equipment,
    determine whether one of a first interrupt and a second interrupt occurs or not, the first interrupt occurring when the determined voltage value reaches a threshold value and the second interrupt occurring when a preset amount of time passes from a time when the sensor starts operating, and
    determine one of a direction and a velocity of the movement of the equipment by using voltage information at times when the first interrupt or the second interrupt occurs and voltage information at a predetermined time before the time s when the first interrupt or the second interrupt occurs,
  wherein the detection apparatus comprises a second calculator to calculate the velocity of the movement of the equipment when the second interrupt occurs, and
  wherein the second calculator calculates the velocity of the movement of the equipment by using a combination of a voltage value at a predetermined time before a time when the second interrupt occurs, a voltage value at a time when the second interrupt occurs, the predetermined time, a difference between a maximum value and a minimum value of the converted voltage value, and a length of the equipment.

* * * * *